United States Patent [19]

Fattor

[11] 4,015,585
[45] Apr. 5, 1977

[54] SOLAR HEATING APPARATUS

[76] Inventor: Arthur Fattor, 5380 S. Holly, Englewood, Colo. 80110

[22] Filed: Aug. 21, 1975

[21] Appl. No.: 606,558

[52] U.S. Cl. .............................. 126/271; 237/1 A
[51] Int. Cl.² ............................................ F24J 3/02
[58] Field of Search ............ 126/270, 271; 237/1 A; 350/293, 299

[56] References Cited

UNITED STATES PATENTS

| | | | |
|---|---|---|---|
| 1,672,750 | 6/1928 | Christiansen | 126/271 |
| 2,976,533 | 3/1961 | Salisbury | 126/270 |
| 3,179,105 | 4/1965 | Falbel | 126/271 |
| 3,514,942 | 6/1970 | Kyryluk | 126/271 |
| 3,884,217 | 5/1975 | Wartes | 126/271 |
| 3,923,039 | 12/1975 | Falbel | 126/270 |
| 3,934,573 | 1/1976 | Dandini | 126/270 |

Primary Examiner—Kenneth W. Sprague
Assistant Examiner—James C. Yeung

[57] ABSTRACT

A solar radiation reflector, including a parabolic-trough reflecting surface, transmits solar radiation in a general line reflection on an upright heat absorber during the winter and early spring months of low to moderate sun angles and a juxtaposed overhanging heat absorber above the upright absorber during summer high-sun angle periods for producing heated transfer medium from each absorber for use in domestic water supply and refrigeration. The reflector may tilt on azimuth to zenith lines for seasonal tilting actions and/or swing East to West to compensate for daily relative sun movement.

8 Claims, 12 Drawing Figures

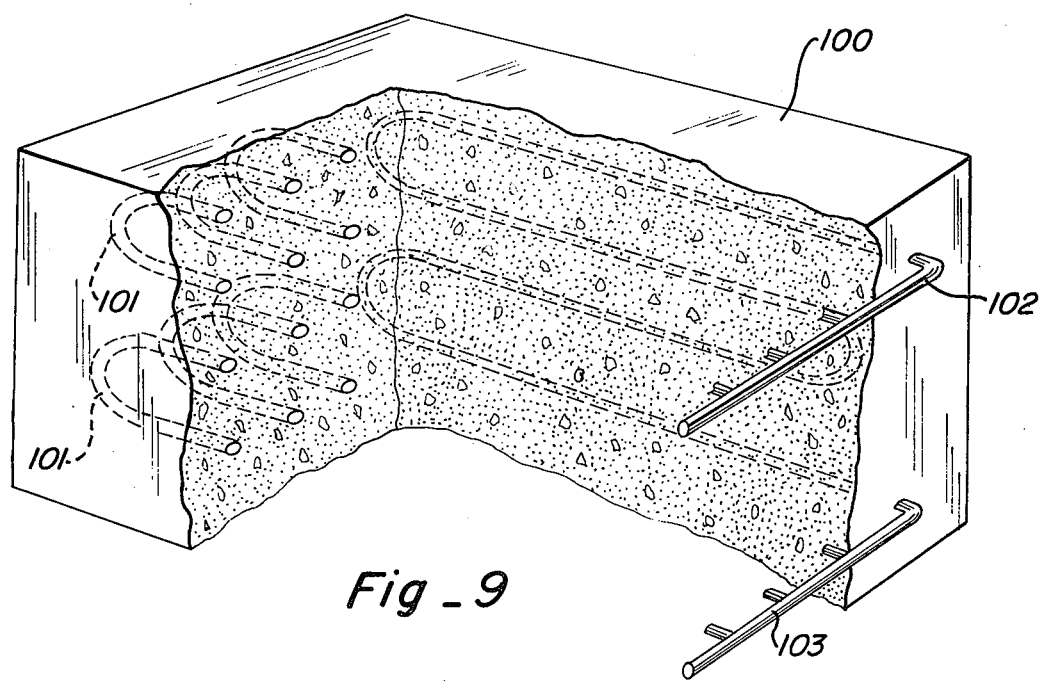
Fig _ 9
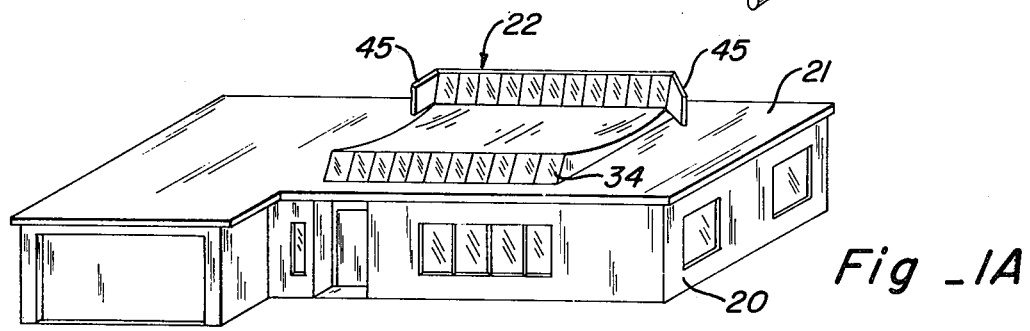
Fig _ 1A
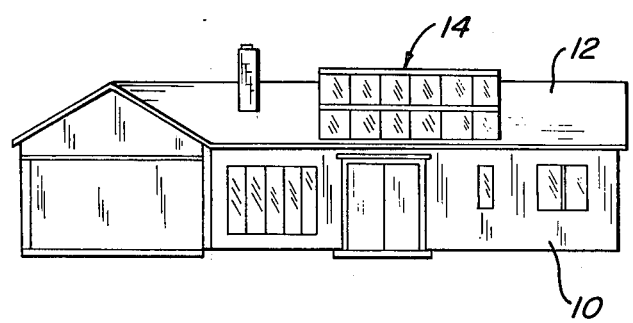
Fig _ 1
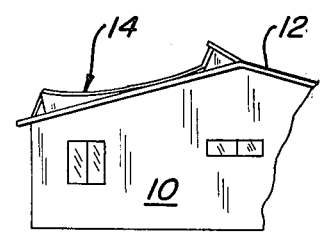
Fig _ 2

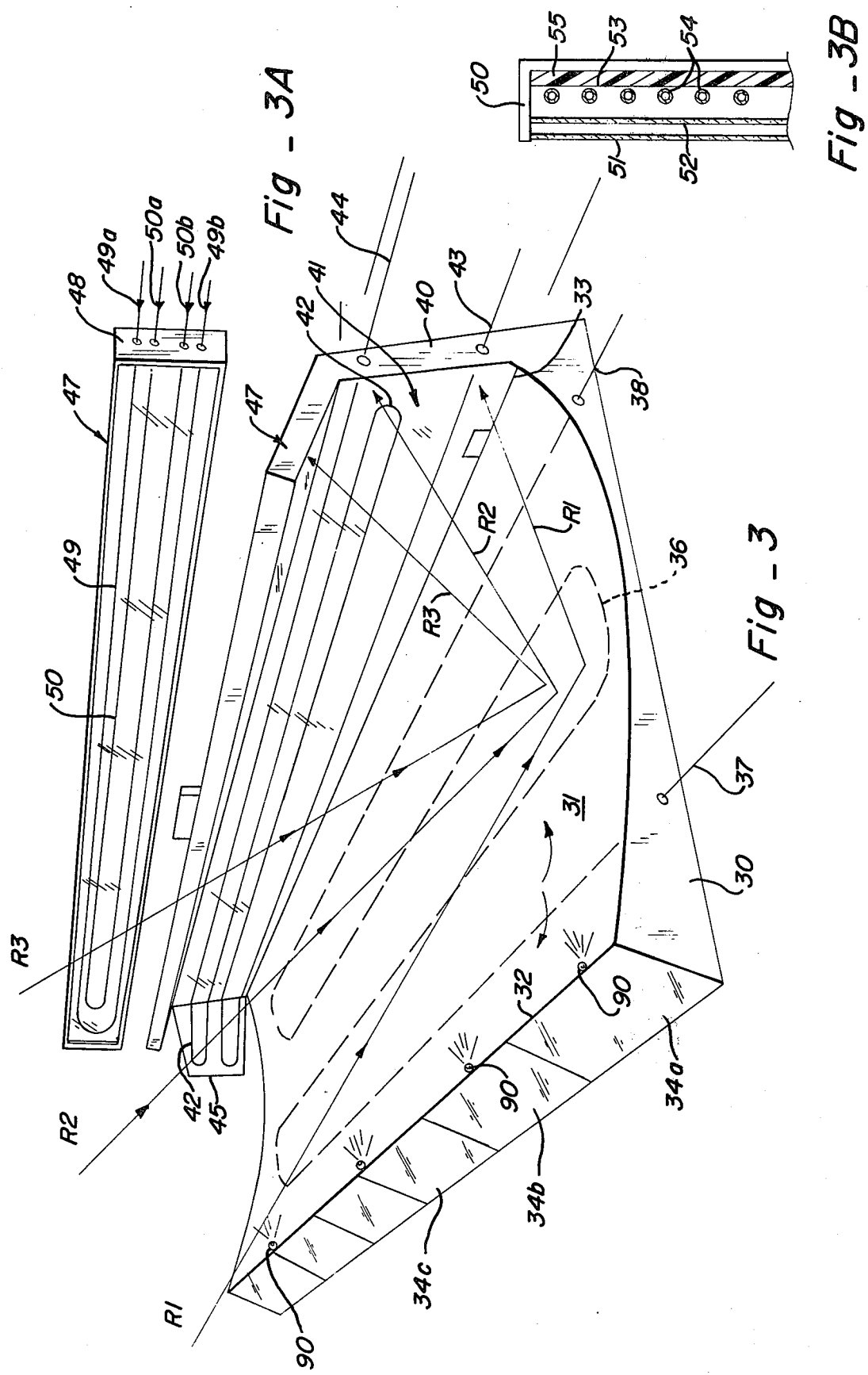

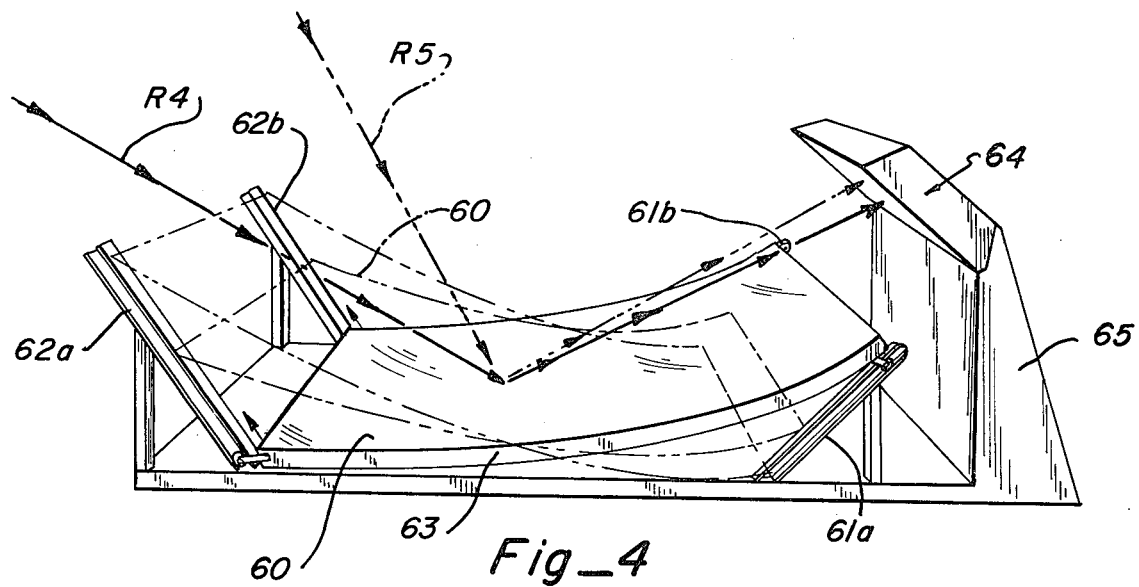
Fig_4
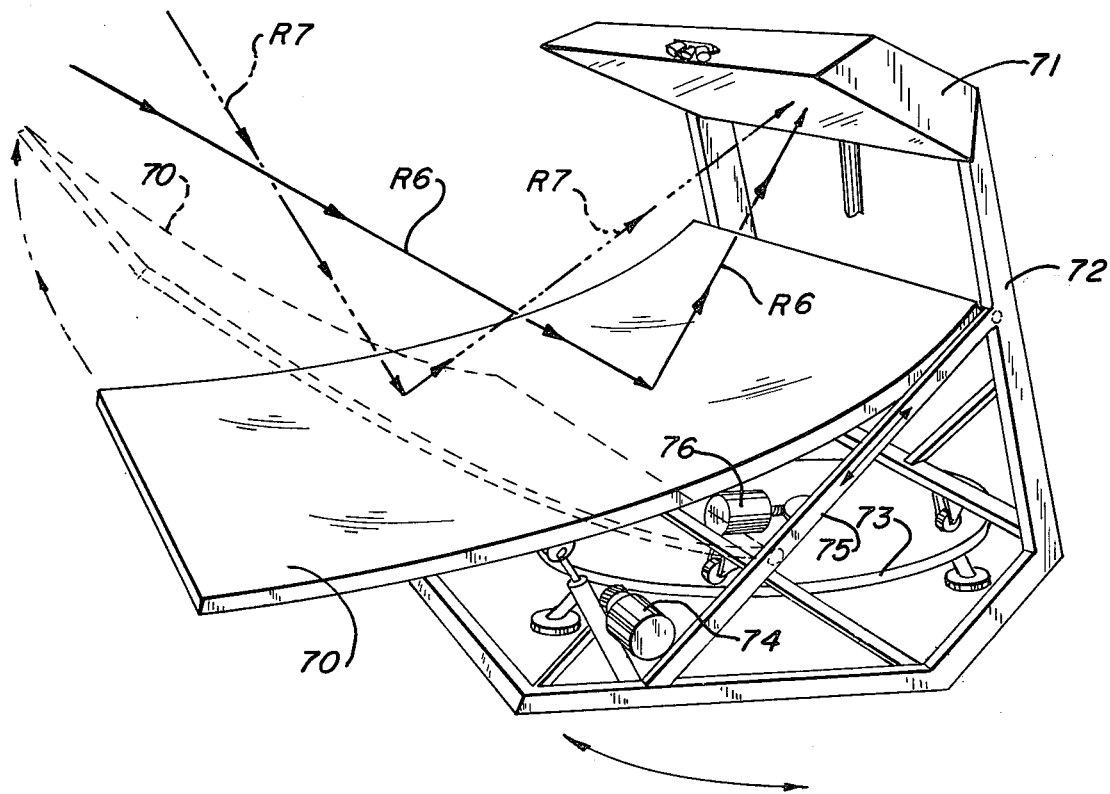
Fig_5

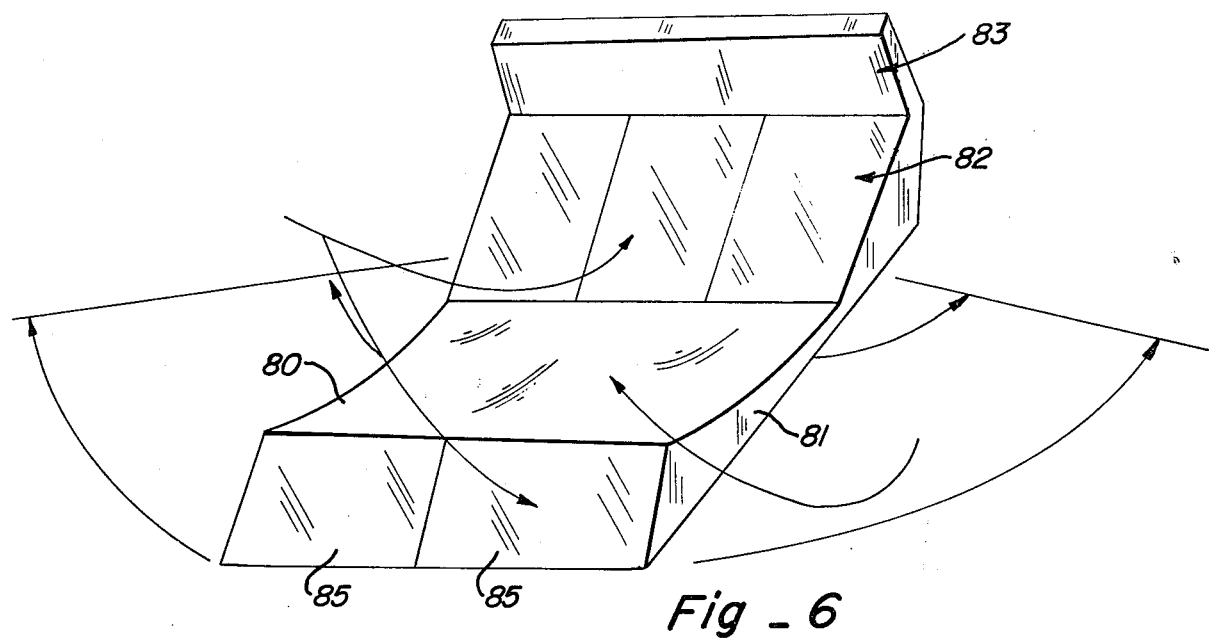
Fig_6
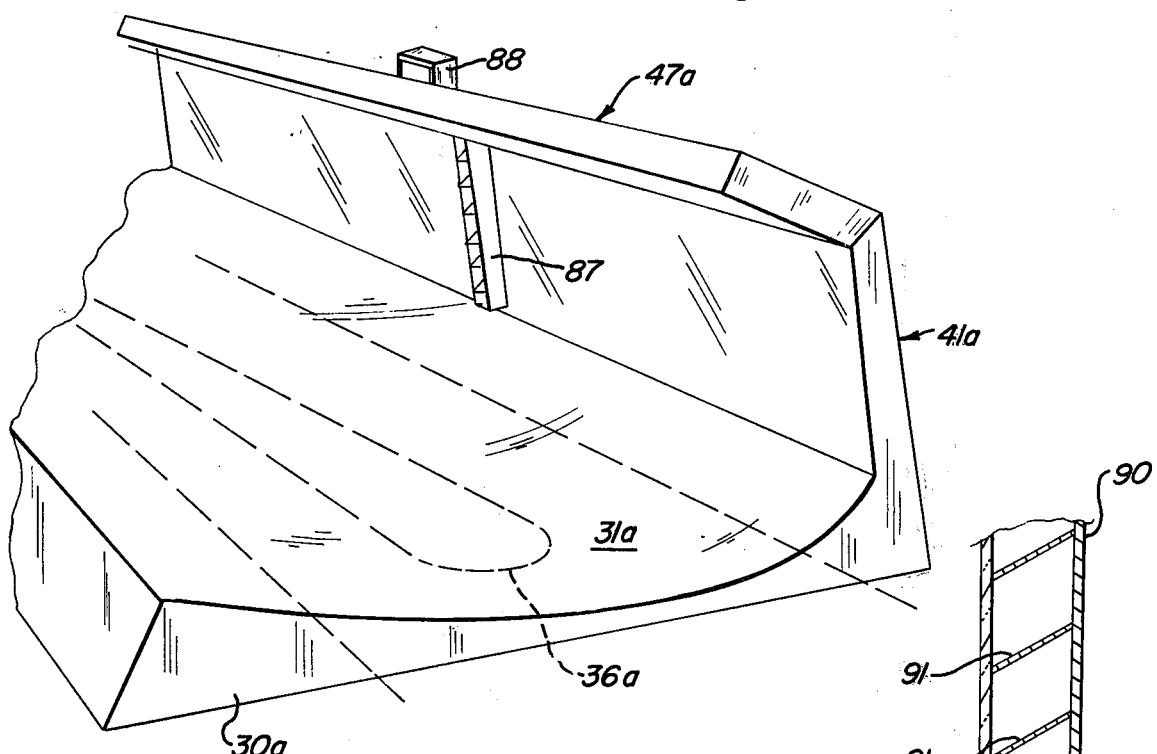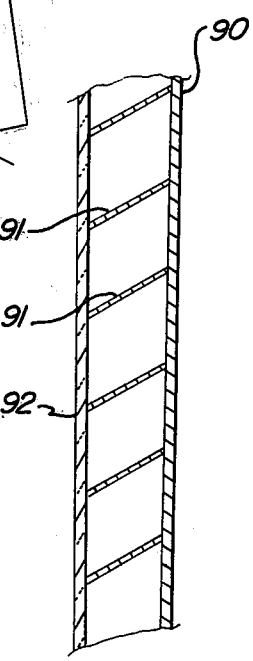
Fig_7
Fig_8

SOLAR HEATING APPARATUS

Human use of solar heating has existed since prehistoric times in one form or another, but heating by means of the sun has been generally limited due to the availability of the sun. Early users of the sun were generally unable to store heat from the sun, which is a severe limitation as it is available for only a few hours in every day. Further, they were unable to store sufficient heat for use during the times when a cloud cover prevented the use of the sun to produce heating. The sun has been used as a solar furnace to produce solar heating, and this normally involves focusing solar radiation from a large area reflector to a small focused area producing high temperatures. Such furnaces require accurate directional controls for the reflector so as to follow exactly the relative movement of the sun to produce the focus point at the desired location. Thus, while highly useful, such furnaces are limited to rather specific functions.

Numerous other devices have been proposed to utilize solar radiation, and each has specific features which are generally useful for specific purposes as desired by the maker. In some types of apparatus, the direct rays of the sun are absorbed for heating; for example, U.S. Pat. No. 3,001,331 shows a roof covering which has heat absorption areas and heat reflection areas which may be changed in their angular relationship to either heat the attic area or to reflect sun rays from the roof. Other devices utilize reflected rays from various types of surfaces, and, for example, these include U.S. Pat. No. 2,625,930, in which a plurality of shallow reflecting surfaces permits the reflection of winter sun into each of the spaces beneath spaced grooves, but the unit reflects the summer sun away from the building. In a modification of a reflector-type device, U.S. Pat. No. 3,321,012 shows a plurality of semi-circular reflectors with a flattened tube mounted in the semi-circular reflectors to absorb both reflected and direct rays from the sun. U.S. Pat. No. 1,993,213 describes a focusing type of device for heating water which requires the accurate positioning of a focusing mirror on the bottom of a boiler. Another type of solar furnace is shown in U.S. Pat. No. 811,274, which illustrates the use of a large area reflector surface focused on a small target and further illustrating the requirements of the tilting mechanism for maintaining exact positioning of the reflector surface in relation to the direction of the solar radiation. A slightly different aspect of the problem is shown in U.S. Pat. No. 3,052,229, which utilizes two oppositely directed mirrors for reflecting solar radiation onto a target and further exemplifies an automatic means of automatically adjusting the mirrors in desired position in relation to solar radiation regardless of the location of the sun. U.S. Pat. No. 3,179,105 illustrates a parabolic solar reflector mounted as the roof of a structure and arranged to reflect and focus winter sun radiation into a small target for producing a heated transfer medium and for reflecting summer solar radiation to prevent heating of the unit.

According to the present invention, there is provided a parabolic trough reflector mounted adjacent an upright radiation heat collector means having an overhanging heat collector whereby the heat from solar radiation may be collected in summer as well as in winter. The parabolic trough reflector provides generally a line image on either of the two absorbers, or an elongated area providing a high temperature for heating the heat transfer medium traversing the absorbers. The unit may be placed as an integral part of the roof of a structure or may be arranged on structure to provide East/West directional rotation and azimuthal tilting for accurately focusing the line reflection on the heat absorption target. The unit is arranged for different slops of a roof and is particularly effective for use in horizontal flat roofs, and its configuration is such as to prevent undesirable radiation to adjacent surfaces and areas.

It is, therefore, included among the objects and advantages of the invention to provide a parabolic trough reflector for solar radiation, reflecting the same to a heat absorption arrangement throughout a year during the different relative movements of the sun.

Another object of the invention is to provide a solar radiation reflector arrangement for producing an elongated, linear reflected area on a heat abosorber.

Still another object of the invention is to provide a solar heat absorber for the use of solar radiation throughout a year.

Yet another object of the invention is to provide a solar heat collector utilizing a parabolic trough mirror for reflecting solar radiation in a linear image on an upright heat absorber.

Still another object of the invention is to provide a solar heat collector arranged for flat roofs and useful for roofs with various pitches.

A further object of the invention is to provide a small linear area of concentrated sun's radiation to produce a high temperature in an absorber area.

An additional object of the invention is to provide a solar radiation heat absorber arranged with different transfer mediums for different temperature absorption ranges inclusive of an absorption cooling loop.

These and other objects and advantages of the invention may be readily ascertained by referring to the following description and appended illustrations in which:

FIG. 1 is a front elevational view of a building structure utilizing a solar heating unit according to the invention.

FIG. 1A is a perspective, schematic view of a building utilizing a solar heating unit according to the invention.

FIG. 2 is a partial side elevation of the structure of FIG. 1.

FIG. 3 is a perspective, schematic view of one form of solar reflector and heat absorber according to the invention.

FIG. 3A is a planned view of a summer heat absorption panel of the device of FIG. 3.

FIG. 3B is a side view of a typical heat absorber using a liquid as a heat transfer medium.

FIG. 4 is a modified view of a reflector with an azimuth tilting according to the invention.

FIG. 5 is a modified reflector and heat absorber arranged for horizontal rotation and azimuth tilting following the relative position of the sun.

FIG. 6 is a schematic perspective view of a further modified form of the solar reflector and heat absorber according to the invention.

FIG. 7 is a modified solar reflector and heat absorber.

FIG. 8 is a cross-sectional detail of the construction of the heat absorber of the device of FIG. 7.

FIG. 9 is a cut-away view of a heat storage arrangement unit for a liquid transfer medium.

As illustrated in FIGS. 1 and 2, a building 10 having a hip roof 12 is provided with a solar energy absorber as shown in general by numeral 14 which generally consists of a series of units according to the invention. A solar absorber is mounted in position to take advantage of as much solar radiation as possible at all times of the year, and the most common place in a building which receives the most solar radiation is usually the roof, Thus, the sloped roof of the unit provides an adequate means for positioning a solar collector. Of course, the building is required to have sufficient structural strength to support the weight of the unit on the roof.

As shown in FIG. 1A a block or concrete wall building 20 with a flat roof 21 is provided with a solar heating unit shown in general by numeral 22 mounted on top of the flat roof 21. This shows the versatility of the unit by being able to be positioned on a flat roof, as well as a sloped roof without any change in the structure of the heat collector itself. In either case, whether the collector is mounted on a flat roof or a sloped roof, it must be adequately secured to withstand the weather elements.

In the form of the device shown in FIG. 3 and 3A, a base frame 30 is arranged to support a parabolic trough reflector 31 which extends from a front edge 32 to a rear edge 33. The parabolic trough reflector is planar in its width or horizontal extent, that is, its width lines are straight and horizontal while the vertical lines are parabolic. This forms a trough, with a horizontal bottom continguous with the parabolic sides, as shown in FIGS. 3, 4, 5 and 6. The front end of the frame 30 is sloped downwardly at an angle, usually about 60°, from the horizontal, and contains solar absorption panels 34a, 34b, 34c, etc. These panels may be typical solar absorption panels which are normally formed with a pair of spaced apart glazing elements (clear glass or plastic) arranged over a black solar absorber and arranged to heat either air passing over the solar absorber or to heat pipes containing flowing liquid which may be secured in the solar absorber and generally where the pipes are in front of the absorber, painted black similarly to the absorber. The solar radiation reflector 31 overlays a sinuous or serpentine array of a pipe 36 having an inlet 37 at one side and an outlet 38 at the outside, the purpose of this line is explained below. Extending upwardly from the reflector frame 30 is an upright frame 40 into which is mounted a solar absorption panel, shown in general by numeral 41. This panel contains typically an inner and an outer glazing for the admission of solar radiation and for the retention of heat resulting from the radiation. Behind the glazing is the black absorption panel and a sinuous fluid line 42 mounted on the absorption plate. The array 42 includes an inlet 43 and an outlet 44 for the purpose of conveying heat picked up in absorber 40. In one form of the invention, a wing 45, shown at the left end of the unit (but may include a wing at each side) extends at an angle from the surface of the absorber 41, and it also includes portions of the surface of the absorber 41, and it also includes portions of the piping 42, which provides an additional absorber arranged to pick up solar radiation from morning sun on the one side and the evening sun on the other side. Extended from the top of the frame 30 is an overhang over the parabolic reflector and over the absorber 40 forming another absorber shown in general by numeral 47. This is shown in detail in FIG. 3A, wherein a framework 48 supports conventional inner and outer glazing and a pipe loop for fluid flow 49 and an inner pipe loop 50. The loop 49 has an inlet 49a and an outlet 49b, and the inner loop has its inlet 50a and an outlet 50b. The use of the overhang absorber and the double loop is explained below.

The parabolic-trough reflector is arranged to reflect sun's rays onto the upright absorbers and the position of the reflected ray is determined by the position of the sun in its seasonal movement, even when the whole unit is mounted stationary on the roof of a building. During the winter time, the sun in northern latitudes, is at a low angle, and a ray R1 is used to indicate the approximate angle of solar radiation during the months of December and January at the highest azimuth of the sun, usually noon. This ray is reflected into a lower portion of the panel 40, and the lower area of the absorber will receive the reflected sun rays during December through about February. At the lowest sun angle, the reflected area will be in the lower most portion of the absorption panel, and as the sun raises, the reflected area also rises on the collector. Thus, with ray R2, the ray from the sun is depicted in about September, October and November and in February, March and April, producing a reflection in about the middle of the solar collector. The ray R3 depicts the angle of the sun's rays in about the period of May, June, July, and August with the reflected area onto the panel 47, which absorbs the heat from the sun's rays at the hottest period of the year. The panel 47 is provided with the two loops, normally one loop is of larger diameter than the other loop. The larger tubing loop 49a and 49b is used for domestic water purposes and is normally connected to the hot water heater. The smaller tubing loop 50a and 50b is used for absorption cooling for an air conditioning system. The fluid from the absorption panel 41 is generally passed to a heat storage unit and is used for heating water for domestic purposes in space heating, as well as domestic water for washing, etc. Where a high heat is required, the upper panel may be substituted for one having a parabolic reflector in back of the tubing to provide a higher temperature liquid in the tubing for such purposes as a generation of electrical energy and the like.

A typical heat absorber using a liquid heat transfer medium is shown in FIG. 3B, wherein a framework 50 supports an outer glazing 51 and an inner glazing 52 covering a black absorption plate 53. Tubing 54 is secured to the plate so that heat from the plate is transferred into the tubing, as well as radiation, directly through the glazing onto the tubing. The tubing is normally painted black for better absorption of the radiation passing through the glazing. An insulating layer 55 prevents loss of heat through the plate and through the framework.

In some instances, it may be desirable to provide a mirror which tilts on the azimuth to provide reflection in a single area. As shown in FIG. 4, a parabolic trough mirror 60 is mounted on uprights 61a and 61b on the right side and upright track 62a and 62b on the opposite end. The mirror is mounted on a frame 63 which includes riders for the upright tracks, and the mirror may be tilted with the one edge riding up the track 61a and 61b and the rear end moving down the track 62a and 62b. As the mirror is tilted the other way, the reverse occurs. In this manner, rays from the sun R4 pass down and are reflected from the mirror onto a solar absorption panel, as shown in general by numeral 64, which is mounted on uprights 65. By tilting the mirror in the position shown in dash lines 60, the rays from the sun R5, likewise, impinge upon the stationary absorber 64. In this manner, the sun's rays may be made to impinge upon a small panel mounted in position to receive all the radiation from the parabolic trough mirror. The tilting of the mirror may be accomplished automatically, as is well known by astronomical instruments, or may be made to tilt by manual operation by the user.

As shown in FIG. 5, a similar unit to that of FIG. 4 is shown, wherein a parabolic trough mirror 70 is arranged to impinge its reflection upon an absorber 71 mounted on the framework 72 holding the same in position. The framework 72 is mounted on a circular track 73, and an electric motor 76 is arranged to turn the framework in accordance with the relative movement of the sun and the earth, so that the parabolic trough mirror is always in exact alignment with the sun. The mirror 70 is arranged to tilt azimuthally along tracks 75 and is motorized by a motor 74. With this arrangement, the mirror 70 may be automatically moved into exact position to permit the impingement of any solar radiation at any time directly on the absorber 71. Thus, winter rays R6 impinging on the mirror 70 are radiated from the mirror surface onto the solar collector 71. As the sun moves higher in the sky during the summer season, the mirror 70 is tilted upwardly to dash position 70 so that a ray R7 impinging on the tilted mirror is reflected about the same position on the absorber 71. This provides an automatic adjustment for various sun angles on compass directions, as well as azimuth directions.

In a modified form of the device of FIG. 4, a parabolic trough mirror 80 is mounted on a framework 81 which is arranged to swing in compass directions from East to West according to the angle of the sun. The parabolic mirror 80 is arranged to reflect radiation onto conventional absorbers 82, as explained in FIG. 3B, or into a solar panel 83, similar to panel 47 of FIG. 3. The front of the frame 81 includes solar panels 85 of conventional design for the direct absorption of solar radiation passing through glazing such as shown in FIG. 3B. This arrangement provides a combination tracking parabolic mirror and a solar panel combination.

In the operation of the solar absorbers there are times when the parabolic mirror is dirty or is covered with a light layer of snow. In such cases, a sprinkler system, which includes sprayers 90 mounted on the edge 32 of FIG 3, provides means for spraying fluid onto the surface of the mirror for cleaning the same of dust, snow or the like. Normally, the sprayers are operated only during above freezing temperatures. Whereas snow covers the parabolic mirror and the sun is shining, hot water or the absorption fluid may be used to pass through the loops 36 for melting the snow from the parabolic mirror.

Sensors may be provided for the unit for the operation of the solar heat collector and/or the operation of the snow removal means of the fluid loop 36 beneath the mirror FIG. 3. As shown in FIG. 7 a base frame 30a supports a parabolic trough mirror 31a. Attached to the frame 30a is an upright heat absorber 41a and the overhang heat absorber 47a. These items include the same elements as that described for FIG. 3. A sensor 87, FIG. 8, is mounted between the mirror 31a and the overhang 47a. This sensor includes a heat sensitive element 90 mounted in a framework and covered by downwardly extended louvers 91 mounted in back of glazing element 92. The baffles are arranged so as to prevent any direct radiation into the heat sensitive element 90 and only reflective rays from the mirror will impinge upon this element. The heat-sensitive unit 88 is connected to computing means along with the heat-sensitive element 90. Thus, the sensors 88 and 90 work in combination to regulate the flow of hot water through the heating coil 36a for the removal of snow. Whenever snow is on the mirror and the sun is out, the sensor 88 will receive heat energy while the sensor 90 will receive none. The imbalance between these two sensors read through electronic circuitry will cause the hot water to pass through the heting loop until the snow is melted on the mirror 31a. As soon as the mirror is activated radiation from the mirror is reflected onto the heat-sensitive element 90 and becomes balanced generally with the heat-sensitive unit 88, so that the hot water supply is cut off from the snow-melting unit and all the hot water will be returned to storage.

A fluid heat transfer medium for use with a solar collector requires a storage unit, for a relatively long term storage of the heat absorbed from the sun. As shown in FIG. 9, a heat storage is formed of a block of concrete 100, having a plurality of tubes passing through the block in a serpentine manner to provide contact with a large volume of concrete. The tubes may be positioned in the form and the concrete added for making concrete block. As many loops as may be desired and necessary are formed in the block. Thus, loop 101 passes through the block, and the inlet to the loops in the block are connected to an inlet manifold 102 and the outlet to the loops is connected to an inlet manifold 103. The concrete should be dense concrete and the exterior should be adequately insulated to retain the heat absorbed in the block. The heat from the water or transfer liquid is given up to the concrete in the block to thereby heat the block, which provides a storage. The heat may be later retrieved by passsing cool transfer liquid or water through the pipes in the block. Thus, for storage, the transfer liquid is passed through a solar collector and then to the block. For retrieval, the liquid is circulated through the block to the radiators in the space to be heated and back through the block. Where a fluid different than water is used in the solar collectors, loops of tubing for that fluid may be embedded in the concrete block and loops of tubing for water may also be embedded in the block providing means for heating the block with the fluid from the solar collector and retrieving the heat by passing water through the other tubes in the block. Additional heat may be provided to a system by using a commercial fuel boiler in conjunction with the heat storage unit.

The concrete block heat sink has many advantages including economy, small space requires, lack of maintenance, etc. The heat transfer qualities of the block may be enhanced by embedding metal in the block to provide increased heat transfer from the concrete spaced from the liquid lines, for example, reinforcing bar laid on tubing loops or coils and embedded in contact with the tubes, etc. The specific heat and conductance of concrete block may be increased by embedding barrels of water or other substances having the desired heat of fusion characteristics, i.e. eutectic salt, etc., in the concrete, with the tubing coiled within or around the barrels, etc., which reduces the size requirements of the block.

What is claimed is:

1. Solar heat absorbing device comprising a. parabolic trough reflector means having its horizontally-oriented extent in straight lines and its vertical extent along a parabola, for focusing solar radiation into a narrow, linear area, which varies vertically at various seasons of the year mounted in a general horizontal position;

b. upright, generally vertical, target means depending upwardly along the length of an edge of said reflector means in position to be impinged on by the linear area reflected radiation as well as receiving direct solar radiation, and an overhang target means depending from said upright target means extending over said reflector means;

c. a plurality of lengths of fluid carrying pipes mounted on said target means to receive solar radiation and having inlet and outlet means for circulating fluid therethrough; and d. said target and carried pipes being blackened.

2. Solar heating device according to claim 1 wherein said upright target means includes wings, including fluid carrying pipes extending outwardly at an angle therefrom toward said parabolic trough for catching reflected radiation from said reflector means during morning and evening hours.

3. Solar heating device according to claim 1 wherein said plurality of pipes includes at least two separate circuits.

4. Solar heating device according to claim 1 wherein said reflector means is underlayed with a plurality of pipes for circulating fluid therethrough, and control means provides for circulating warm fluid therethrough for snow and ice removal on said reflector means.

5. Solar heating device according to claim 4 wherein said control means includes shade means to prevent direct sun on activator means for said plurality of pipes in said upright target means to prevent activation of fluid flow means therethrough when no reflected radiation is received by said control means and includes openings for reflected radiation for activation of fluid flow means.

6. Solar heating device according to claim 1 wherein said reflector means is mounted for tilting along azimuth lines to compensation for seasonal position of the sun.

7. Solar heating device according to claim 1 wherein said reflector means is mounted for East to West pivoting to compensate for the sun's daily movement.

8. Solar heating device according to claim 1 wherein the south facing edge of said reflector means opposite said upright target means includes direct solar radiation absorption means extending downward from said reflector means including a plurality of pipes mounted therein and having means for circulating fluid therein.

* * * * *